(12) United States Patent  (10) Patent No.: US 7,477,844 B2
Gumaste et al.  (45) Date of Patent: Jan. 13, 2009

(54) METHOD AND SYSTEM FOR UTILIZING VIRTUAL LOCAL ACCESS NETWORK ADDRESSING IN OPTICAL NETWORKS

(75) Inventors: Ashwin Anil Gumaste, Dallas, TX (US); Raghu Ramireddy Valisammagari, Murphy, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 594 days.

(21) Appl. No.: 11/015,228

(22) Filed: Dec. 17, 2004

(65) Prior Publication Data

US 2006/0133811 A1 Jun. 22, 2006

(51) Int. Cl.
*H04B 10/20* (2006.01)

(52) U.S. Cl. ...................................... 398/59

(58) Field of Classification Search ................ 398/59, 398/83, 79, 51, 43
See application file for complete search history.

(56) References Cited

U.S. PATENT DOCUMENTS

| 6,128,665 | A | 10/2000 | Iturralde | 709/238 |
| 6,310,882 | B1 | 10/2001 | Lorenz et al. | 370/401 |
| 6,515,993 | B1 | 2/2003 | Williams et al. | 370/395.53 |
| 6,532,088 | B1 * | 3/2003 | Dantu et al. | 398/43 |
| 6,577,642 | B1 | 6/2003 | Fijolek et al. | 370/465 |
| 6,614,787 | B1 | 9/2003 | Jain et al. | 370/390 |
| 6,788,681 | B1 | 9/2004 | Hurren et al. | 370/389 |
| 6,862,280 | B1 | 3/2005 | Bertagna | 370/392 |
| 2001/0026384 | A1 * | 10/2001 | Sakano et al. | 359/124 |

FOREIGN PATENT DOCUMENTS

EP 1406401 A1 * 12/2002

* cited by examiner

*Primary Examiner*—Quan-Zhen Wang
(74) *Attorney, Agent, or Firm*—Baker Botts L.L.P.

(57) ABSTRACT

An optical network includes an optical ring, a plurality of local nodes, and a data center node. The plurality of local nodes are coupled to the optical ring and each local node is capable of receiving traffic from a local client and associating a transmitter tag with the traffic. The transmitter tag identifies a virtual network of the local client. The local node is further capable of transmitting the traffic on the optical ring.

The data center node is also coupled to the optical ring and is capable of receiving traffic transmitted by one of the local nodes and determining a receiver tag for the traffic, based on the transmitter tag associated with the traffic and the local node that transmitted the traffic. The data center node is also capable of associating the selected receiver tag with the traffic and transmitting the traffic on the optical ring.

20 Claims, 9 Drawing Sheets

METHOD AND SYSTEM FOR UTILIZING VIRTUAL LOCAL ACCESS NETWORK ADDRESSING IN OPTICAL NETWORKS

TECHNICAL FIELD

The present invention relates generally to optical networks and, more particularly, to a method and system for a data-centric architecture in an optical network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

In recent years, optical networks have, to an increasing extent, replaced and/or been integrated with conventional, non-optical systems. Nonetheless, many functionalities provided by or techniques supported by non-optical systems are difficult to duplicate with optical networks and/or create unique problems when implemented using optical architectures. As a result, despite the advantages optical networks possess, their use may be limited in legacy systems that utilize protocols or functionality not easily or effectively replicated on optical networks.

SUMMARY

A method and system for a data-centric architecture in an optical network are provided. According to one embodiment, an optical network includes an optical ring, a plurality of local nodes, and a data center node. The plurality of local nodes are coupled to the optical ring and each local node is capable of receiving traffic from a local client and associating a transmitter tag with the traffic. The transmitter tag identifies a virtual network of the local client. The local node is further capable of transmitting the traffic on the optical ring.

The data center node is also coupled to the optical ring and is capable of receiving traffic transmitted by one of the local nodes and determining a receiver tag for the traffic, based on the transmitter tag associated with the traffic and the local node that transmitted the traffic. The data center node is also capable of associating the selected receiver tag with the traffic and transmitting the traffic on the optical ring.

Technical advantages of certain embodiments of the present invention include centralized data storage and processing in an optical network, simplified addressing, and the elimination of certain network conditions that diminish network efficiency. Other advantages include providing a scalable and flexible system that supports one or more addressing protocols utilized by conventional non-optical networks. Another technical advantage of one or more embodiments may include the ability to dynamically reconfigure as client devices are added or removed from the network.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
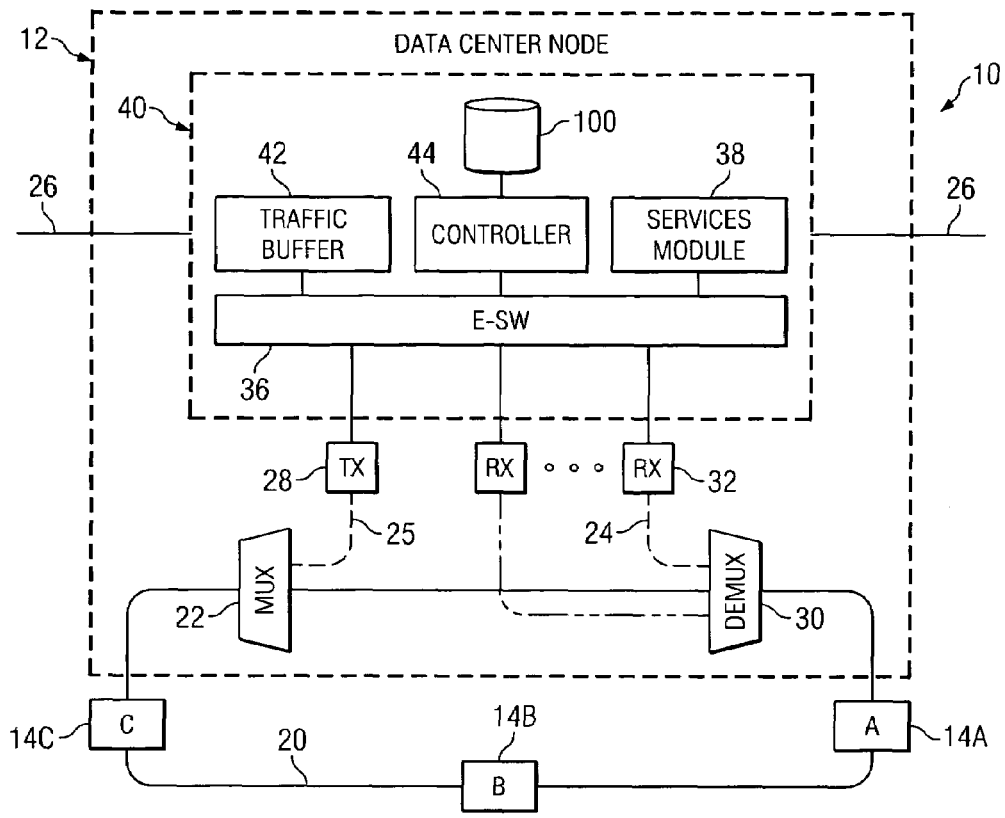
FIG. 1 is a block diagram illustrating an optical ring network in accordance with one embodiment of the present invention.

FIG. 1 illustrates an optical ring network 10 in accordance with one embodiment of the present invention. Network 10 includes a data center node 12 and a plurality of local nodes 14 coupled to an optical ring 20. During operation, data center node 12 facilitates the communication of data between local nodes 14 and/or other components by switching optical signals propagating on optical ring 20 between appropriate wavelengths to effect delivery of data to local nodes 14. To simplify the addressing and routing of data, network 10 may support the creation and use of virtual networks, such as virtual local area networks (VLANs). Because network 10 may communicate data using optical signals that are broadcast to all local nodes 14 in a virtual network, and not merely the intended destination node, the use of VLAN addressing may cause traffic transmitted on network 10 to be returned to the source local node 14, creating an undesirable result known as "reflection." Consequently, network 10 may utilize a VLAN mapping scheme, as described in greater detail below, to ensure that a particular local node 14 does not attempt to deliver traffic to the source client device when that traffic returns to the local node 14 on optical ring 20.

Although FIG. 1 illustrates a particular embodiment and configuration of network 10, other suitable types of optical networks may be used in accordance with the present invention. Network 10 may include, as appropriate, a single, uni-directional fiber; a single, bi-directional fiber, or a plurality of uni- or bi-directional fibers. In the illustrated embodiment, network 10 is an optical network in which a number of optical channels are carried over a common path at different wavelengths. Additionally, network 10 may be a wavelength division multiplexed (WDM) network, a dense wavelength division multiplexed (WDM) network, or any other suitable multi-channel network. Network 10 may be represent all or a portion of a short-haul metropolitan network, long-haul inter-city network, or any other suitable network or combination of networks.

The illustrated embodiment of network 10 includes a data center node 12 and a plurality of local nodes 14 coupled to an optical ring 20. In the illustrated embodiment, optical ring 20 comprises a single uni-directional fiber, transporting traffic in a counterclockwise direction. Optical ring 20 optically connects the plurality of local nodes 14a-14c and data center node 12 with each local node 14 capable of both transmitting traffic to and receiving traffic from other local nodes 14 via data center node 12. Moreover, data center node 12 may be capable of receiving traffic from components external to network 10 through an external connection 26. For example, external connections 26 may connect network 10 to other optical networks including those similar in structure and operation to network 10.

As used herein, "traffic" means information transmitted, stored, or sorted in the network, including any request for services as discussed in more detail below. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information carried by this traffic may be structured in any suitable manner. Although the description below focuses on an embodiment of network 10 that communicates traffic on optical ring 20 in the form of optical frames, network 10 may be configured to communicate traffic structured in the form of frames, as packets, or in any other appropriate manner.

Additionally, network 10 supports one or more VLANs (not shown) that each represent a logical grouping of devices (clients) coupled to local nodes 14 and/or coupled to other networks to which data center node 12 is coupled. For example, in a particular embodiment, all computers associated with a company may be members of a single VLAN even though those computers are geographically distributed. In general, VLANs may represent any suitable groupings of any appropriate devices within network 10 and/or devices coupling to network through external connection 26. Nonetheless, the description below focuses, for purposes of illustration, on an embodiment of network 10 in which VLANs represent groupings of client devices coupled to ports of local nodes 14 within network 10.

Local nodes 14 are each operable to add and drop traffic to and from optical ring 20 to facilitate communication between a plurality of client devices coupled to each local node 14 through a plurality of client ports (not shown). As used herein, the term "each" means every one of at least a subset of the identified items. More specifically, each local node 14 receives traffic from local clients 16 and adds this traffic to the optical ring 20. At the same time, each local node 14 receives traffic from optical ring 20 and drops traffic destined for local clients 16 of that local node 14. For the purposes of this description, local nodes 14 may "drop" traffic by transmitting a copy of the traffic to any appropriate components coupled to local nodes 14. As a result, each local node 14 may drop traffic from optical ring 20 by transmitting the traffic to components coupled to that local node 14 while allowing the traffic to continue to downstream components on optical ring 20. Local clients 16 may represent any devices appropriate for the communication or storage of information on optical network 10. Examples of local clients 16 may include, but are not networked personal computers (PCs), telephones, fax machines, hard drives, and web servers. Local node 14 may add traffic to optical ring 20 by inserting the added traffic into the traffic currently being transmitted by data center node 12 and local nodes 14 on optical ring 20. Local node 14 may drop traffic from optical ring 20 by making the traffic available for transmission to local clients 16 of local nodes 14. Additionally, local node 14 may be able to drop traffic for transmission to local clients 16 but yet allow the traffic to continue circulating on optical ring 20. In particular embodiments, traffic is passively added to and dropped from optical ring 20 using an optical coupler or other suitable device. "Passively" in this context means the adding or dropping of channels without using optical switches that use power, electricity, and/or moving parts. By contrast, an "active" device would use power, electricity, or moving parts to perform work. Additionally, although data center node 12 and local node 14 are described below as transmitting and receiving optical traffic on ring 20 as optical frames, data center node 12 and/or local node 14 may transmit and receive traffic as optical signals providing information structured in any appropriate manner. The contents and operation of local node 14, according to a particular embodiment, are discussed in greater detail below with respect to FIG. 3. Although FIG. 1, illustrates one embodiment of network 10 that includes a particular number of local nodes 14 and data center nodes 12, network 10 may include any appropriate number of local nodes 14 and data center nodes 12 configured in any appropriate manner.

Once traffic is dropped from the optical ring 20, local node 14 may provide optical-to-electrical conversion of the dropped traffic for extracting data based on headers or tags associating portions of the traffic with a destination node and/or port. In particular embodiments, each local node 14 is operable to drop traffic transmitted at a receiving wavelength $\lambda_R$. Each local node 14 electrically converts traffic transmitted at $\lambda_R$ and extracts portions of associated traffic destined for the node 14 based on addressing information in the traffic. Addressing information may include a header, a VLAN tag, and/or any other suitable addressing information. In certain embodiments, each local node 14 comprises a switch element (not shown in FIG. 1) which may forward the traffic, or a portion thereof, to one of a plurality of local clients based on addressing information. In one embodiment, the switch element comprises a Layer 2 (L2) switch. Additionally, the switch element may be configured, where appropriate to determine a local port to which traffic should be forwarded based on a VLAN tag in the addressing information, as described in greater detail below.

Each local node 14 may also be assigned a subband or a portion of a subband for adding traffic to optical network 10 that is different from subbands assigned to other local nodes 14. A subband, as used herein, means a portion of the bandwidth of the network comprising a subset of the channels of the network. In one embodiment, the entire bandwidth of a network may be divided into subbands of equal bandwidth, or, alternatively, of differing bandwidth. In one embodiment, the subband assigned to a local node 14 is a single wavelength, different from wavelengths assigned to the other local nodes 14. For example, the local node 14A may be assigned a wavelength $\lambda_1$, wherein local node 14A adds traffic transmitted at the wavelength $\lambda_1$ to optical ring 20. Similarly, the local nodes 14B and 14C may be assigned wavelengths $\lambda_2$ and $\lambda_3$, respectively, to add traffic to optical ring 20. In addition, transmitting wavelengths $\lambda_1$, $\lambda_2$, and $\lambda_3$ may be different from receiving wavelength $\lambda_R$. Thus, in this case, interference between channels in network 10 is substantially reduced by adding traffic at the assigned wavelengths and dropping traffic at the receiving wavelength. In another embodiment, each local node 14 is assigned a different subband including two or more wavelengths in which to add its local traffic. Thus, interference between channels in network 10 is substantially eliminated by adding traffic in its subband and dropping traffic at the receiving wavelength. Additional components may be installed in local nodes 14 for receiving additional wavelengths, as will be discussed below. In yet another embodiment, at least one local node 14 is operable to receive traffic at a second receiving wavelength different from the receiving wavelength used by one ore more other nodes 14.

Data center node 12 receives optical signals including service requests from local nodes 14 and transmits optical signals including responses to the service request to local nodes 14 at a receiving wavelength. Optical signals, as used herein, include channels which carry data traffic in network 10. Data is a type of traffic that may include audio, video, textual, real-time, non-real-time and/or other suitable data. In one embodiment, data center node 12 includes a demultiplexer 30, a plurality of receivers 32, a data center 40, a transmitter 28, and a multiplexer 22. The demultiplexer 30 demultiplexes WDM or other multichannel optical signals transmitted over the optical ring 20 into constituent channels and sends each optical signal 24 to an optical receiver 32. Each optical receiver 32 electrically recovers the encoded data from the corresponding traffic. The data is then forwarded to the data center 40.

The data center 40 receives the data, sorts the data based on the node 14 for which it is destined, and passes the sorted data to transmitter 28 for transmitting traffic to local nodes 14 at a receiving wavelength $\lambda_R$. As used herein, a destination node is the local node 14 that is the destination for transmitted data on the ring. Optical transmitter 28 generates an optical signal 25 at the receiving wavelength $\lambda_R$. The optical signal 25 comprises an optical signal with at least one characteristic modulated to encode audio, video, textual, real-time, non-real-time, or other suitable data.

In particular embodiments, data center node 12 comprises multiple transmitters 28 (not illustrated) and, in response to the level of traffic to be transmitted by data center node 12 exceeding a threshold (e.g., 10 Gigabits per second (Gb/s)), data center node 12 transmits traffic in two or more receiving wavelengths. For example, channel spacing between receiving wavelengths may be 100 Gigahertz (GHz) in the C-band. In such embodiments, different subsets of local nodes 14 are assigned different receiving wavelengths. For example, data center node 12 may transmit traffic destined for local node 14A at a first receiving wavelength $\lambda_{R1}$ and traffic destined for local nodes 14B and 14C at a second receiving wavelength $\lambda_{R2}$. In certain embodiments, the channel spacing may be selected to avoid or minimize crosstalk between adjacent signals. If two or more transmitters 28 are transmitting at two or more receiving wavelengths, the optical information signals 25 are multiplexed into a single optical signal by the multiplexer 22 for transmission on the optical ring 20.

In the illustrated embodiment, the data center 40 includes an in-line switch 36, a traffic buffer 42, a controller 44, a services module 38, and a memory 100. Switch 36 is coupled to the traffic buffer 42, the controller 44, and services module 38. While not illustrated, data center 40, in one embodiment, comprises a Layer 3 (L3) switch for passing traffic to and from an Internet Protocol (IP) network coupled to network 10 via data center node 12. Switch 36 passes traffic received from the receivers 32 to the traffic buffer 42 and forwards traffic stored in the traffic buffer 42 to transmitter 28. Switch 36 may comprise a Layer 2 switch such as an Ethernet switch, IP switch, fiber channel (FC) switch, a router or other suitable devices for selectively directing traffic. Traffic buffer 42 comprises memory operable to store inter- and intra-network traffic. Traffic buffer 42 may include a portion or all of a single memory device or multiple memory devices. For the purposes of simplicity, all memory or memory devices are referred to here as "memory 100." Nonetheless, memory 100 may represent one or more physically distinct memory devices. Memory 100 may represent computer disks, a hard disk memory, random access memory (RAM), read-only memory (ROM), or any other suitable storage media.

Controller 44 controls access to traffic buffer 42 and services module 38 and may comprise logic stored in memory 100. This logic may comprise computer disks, a hard disk memory or other suitable computer-readable media, rand application specific integrated circuits (ASIC), field programmable gate arrays (FPGA), digital signal processors (DSP), or other suitable specific or general purpose processors, transmission media, or other suitable media in which logic may be encoded and utilized. In one embodiment, controller 44 comprises a server. Controller 44 is operable to send a command signal to the electrical switch 36 to facilitate the sorting of both inter- and intra-network traffic.

In one embodiment, traffic buffer 42 has buffer addresses associated with each local node 14. In this case, conventional "write in" and "read out" commands may be used to store traffic destined for a local node 14 at a buffer address associated with that local node 14. As a result, the command signal sent to the switch 36 may include a buffer address associated with the destination node. After receiving the command signal, the switch 36 passes the data to the corresponding buffer address in the traffic buffer 42. A scheduler in the controller 44 schedules data out of the queue associated with the corresponding buffer address. In one embodiment, the queue is a first-in first-out queue. It will be understood that the traffic may be otherwise sorted. The switch 36 forwards the traffic stored at the buffer address to transmitter 28. As discussed above, the transmitter 28 encodes an optical signal 25 at the receiving wavelength such the each local node 14 is operable to drop the receiving wavelength from optical network 10.

The services module 38 is operable to process and generate a response to a request for a service from a node, wherein the node may be an intra- or inter-network node, i.e., a node in or external to network 10, respectively. It will be understood that services may include providing data, storing data, processing data, or providing other services in a network system. Services module 38 may be implemented as hardware (e.g., a microchip), firmware and/or software. Local nodes 14 transmit at assigned wavelengths requests for services to data center node 12, which are received by demultiplexer 30 and electronically recovered by receiver 32. Once recovered from the optical signal 24, the request is passed to switch 36. The switch 36 forwards the request to the services module 38. The request may be directly forwarded to the services module 38 or forwarded to an address in buffer 42 associated with services module 38 prior to forwarding the request to service module 38. The services module 38 processes the request and generates a response. In one embodiment, the response to a request for video includes a file containing audiovisual content. In another embodiment, the response to a request to store data includes an acknowledgement that data was received. In yet another embodiment, the response includes data processed by the services module 38. The switch 36 receives the response generated by the services module 38 and passes it to the address in the traffic buffer 42 associated with the destination node. The switch 36 forwards the response along with other traffic stored at the buffer address to a transmitter 28 associated with the buffer address and, thus, associated with the destination node. The transmitter 28 encodes the response (and potentially other responses to the same or different nodes 14) as an optical information signal 25 at a receiving wavelength $\lambda_R$.

Figures 2A, 2B:
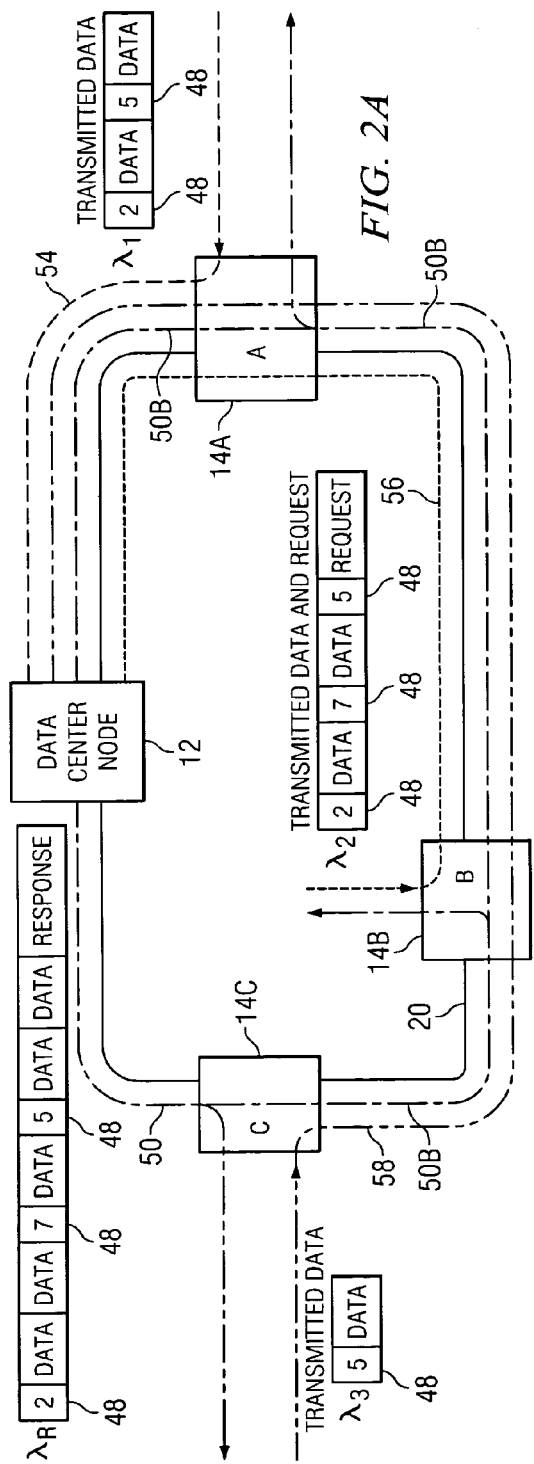
FIG. 2A is a block diagram illustrating an example operation of the optical ring network of FIG. 1.
FIG. 2B figuratively represents a traffic buffer in the optical ring network in accordance with one embodiment of the present invention.

FIG. 2A illustrates one embodiment of the optical network 10 of FIG. 1 in operation as local nodes 14 transmit traffic to data center node 12. As shown, data center node 12 receives optical traffic 54 transmitted at $\lambda_1$, optical traffic 56 transmitted at $\lambda_2$, and optical traffic 58 transmitted at $\lambda_3$ from nodes 14A, 14B, and 14C, respectively. Data center node 12 receives the traffic 54, 56, and 58 and sorts the traffic and any responses to the optical traffic 54, 56, and 58 based on some characteristic of the traffic. In embodiments that utilize VLAN addressing, data center node 12 may sort traffic based on VLAN tags 48 associated with the traffic and may aggregate data destined for a common VLAN location. Data center node 12 generates responses, if appropriate, and, also if appropriate, sorts the data including responses by VLAN tag 48, and passes the sorted data to transmitter 28 for transmitting traffic at the receiving wavelength $\lambda_R$. Transmitter 28 encodes an optical signal 50 with the data including responses at wavelength $\lambda_R$, where each local node 14 is operable to drop signals at wavelength $\lambda_R$. In order to control interference, the receiving wavelength $\lambda_R$ is different from the transmitting wavelengths $\lambda_1$, $\lambda_2$, and $\lambda_3$. In the illustrated embodiment, the local nodes 14A, 14B, and 14C are each configured to passively split optical signal 50 into a drop signal 50A and a pass-through signal 50B. More specifically, each local node 14 drops drop signal 50A that include any traffic associated with VLANs for which that local node 14 supports client ports 16. FIGS. 4A-4D and 5A-5C illustrate this portion of the operation in greater detail.

Conventional optical-to-electrical conversion may be performed on the dropped signal to extract any data including responses destined for the local node 14. Once extracted, a switch element (not illustrated) may forward the data and responses to appropriate local clients based on associated addressing information including, when appropriate, VLAN tags 48 identifying a VLAN of which the local client intended to receive the data or response is a member. Although not shown, traffic may also include additional addressing information 46, as appropriate, such as a Media Access Control (MAC) address or other information identifying a particular device that is a member of the relevant VLAN.

For example, node 14A adds the optical traffic 54, which is transmitted at wavelength $\lambda_1$, to optical ring 20. The optical traffic 54 includes two blocks of data whose destination VLAN are VLANs "2" and "5", respectively, as indicated by the VLAN tags 48. Data center node 12 receives and decodes the optical traffic 54 and recovers the data and VLAN tags 48 for each data block. Data center node 12 sorts the data by destination VLAN by storing the traffic at a buffer address associated with the corresponding destination VLAN. The node 14B also adds the optical traffic 56, which is transmitted at wavelength 2, to optical ring 20. The optical traffic 56 includes two blocks of data and a request (for example, a video-on-demand service request) having destinations VLANs "2", "7", and "5", respectively, as indicated by the associated VLAN tag 48. Data center node 12 receives and decodes the optical traffic 56 and recovers the data and request and the destination node for the data and request, as indicated by VLAN tag 48. Data center node 12 processes the request encoded in the optical traffic 56 and generates a response, as discussed above. Data center node 12 sorts the data by destination VLAN by storing the traffic at a buffer address associated with the corresponding destination VLAN. In the illustrated embodiment, the node 14C also adds the optical signal 58, which is transmitted at the wavelength $\lambda_3$, to optical ring 20. The optical signal 58 includes one block of data whose destination is the node "5" as indicated by the VLAN tag 48. Data center node 12 receives and decodes the optical signal 58 and recovers the data including the destination VLAN tag 48. Data center node 12 sorts the data by destination VLAN by storing the traffic at a buffer address associated with the corresponding destination VLAN. The stored data is forwarded to transmitter 28 in response to a command signal from controller 44.

In one aspect of operation, the controller 44, illustrated in FIG. 1, controls the storing and transmission of traffic in network 10 via buffer 42. Controller 44 sends a command signal to the switch 36 including a buffer address associated with the destination node. The command signal may be sent periodically, in response to a buffer address approaching capacity, or based on any other suitable criteria. After receiving the command signal, the switch 36 passes the data to the corresponding buffer address in the traffic buffer 42, which is represented in FIG. 2B.

FIG. 2B figuratively represents traffic buffer 42 in accordance with the illustrated embodiment. Each buffer address is associated with a destination VLAN. The illustrated buffer indicates that VLAN "2" will be sent two data blocks, where one originated from the node 14B and one from the node 14C. In this embodiment, the illustrated buffer also indicates that VLAN "7" will be sent one data block, originating from node 14A. In this embodiment, the illustrated buffer also indicates that VLAN "5" will be sent two data blocks and a response, one data block from each of nodes 14A and 14B and the response from the services module 38. Each data block will be associated with VLAN tags 48 identifying the destination node of the respective data block. In one embodiment, buffer 42 automatically forwards traffic to transmitter 28 such as in response to an associated address reaching capacity. Once each block is labeled with the original VLAN tag 48 or new VLAN tags 48 (as described below), the data and VLAN tags 48 will be transmitted at the receiving wavelength $\lambda_R$. As described above, the nodes 14A, 14B, and 14C are configured to receive the traffic at the receiving wavelengths $\lambda_R$. Additionally, data center node 12 may generate, in addition to VLAN tag 48, other addressing information 46 for one or more of the data blocks.

Figure 3:
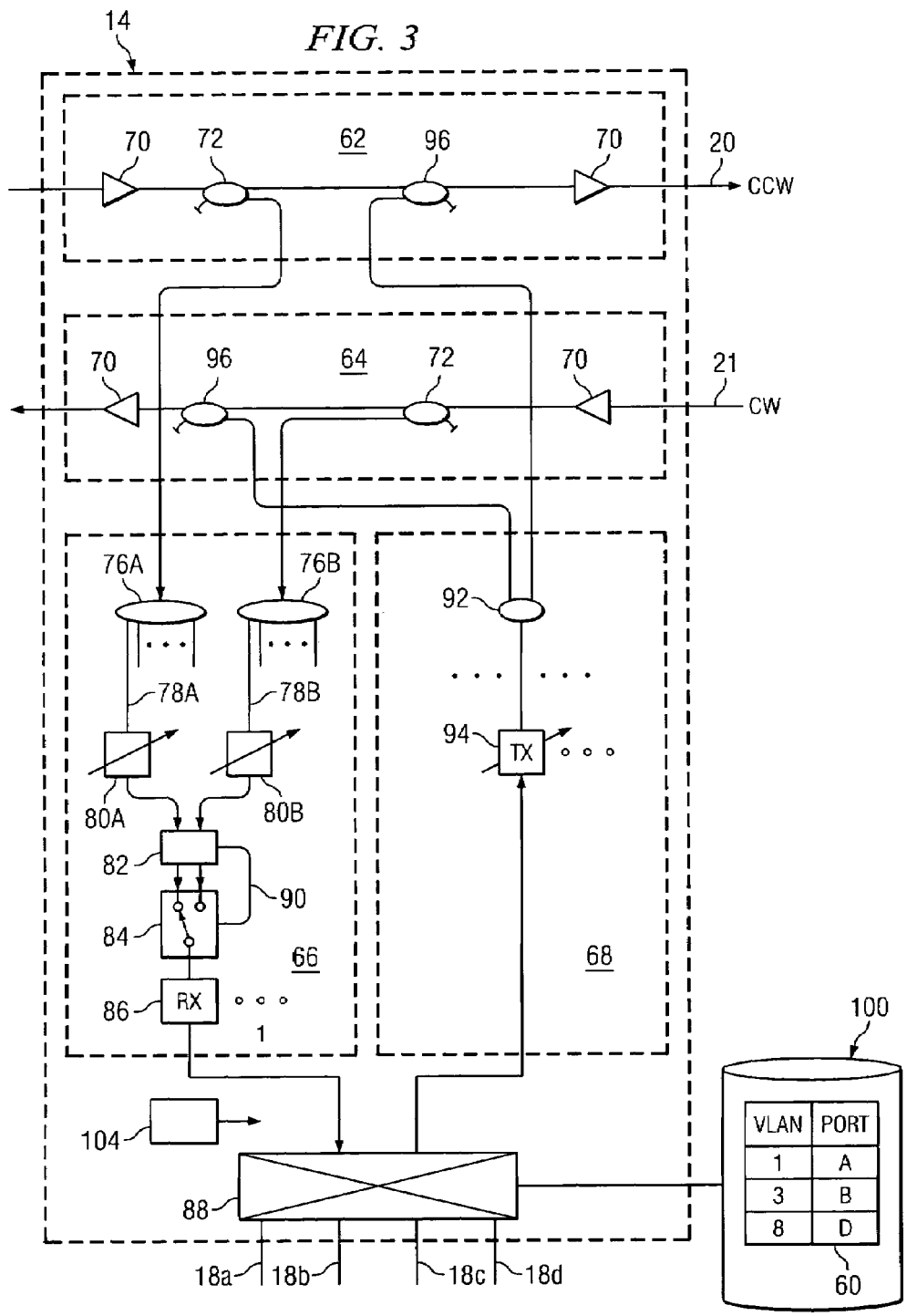
FIG. 3 is a block diagram illustrating one embodiment of an add/drop node of the optical ring network of FIG. 1.

FIG. 3 illustrates one embodiment of an add/drop node 14. In the illustrated node 14, traffic is passively dropped from fiber 20 and 21. While not illustrated in FIG. 1, adding fiber 21 to network 10 may provide protection switching. If fiber 21 is not included in network 10, the following embodiment of add/drop node 14 illustrated in FIG. 3 will not include components associated with fiber 21. The illustrated embodiment uses couplers and a receiving element 66 to extract wavelengths assigned to node 14 and forward data segments to associated clients. As described below, local traffic may be added to the fibers 20 and 21 in a subband assigned to node 14 for adding traffic to fibers 20 and 21.

Referring to FIG. 3, the node 14 comprises a first, or counterclockwise transport element 62, a second, or clockwise transport element 64. In the illustrated embodiment, local node 14 comprises the transmitting element 68 and the receiving element 66. Alternatively, transmitting element 68 and the receiving element 66 may be separate from local node 14. The transport elements 62 and 64 add and drop traffic to and from the fibers 20 and 21, remove previously transmitted traffic, and/or provide other interaction of local node 14 with the fibers 20 and 21. The transmitting element 68 generates local add signals to be added to the fibers 20 and 21 by the transport elements 62 and 64. The receiving element 66 receives local drop signals dropped from the fibers 20 and 21 by transport elements 62 and 64. In particular embodiments, the transport, transmitting, and receiving elements 62, 64, 68, and 66 may each be implemented as a discrete card and interconnected through a backplane of a card shelf of the node 14. Alternatively, the functionality of one or more elements 62, 64, 68, and 66 may be distributed across a plurality of discrete cards. In this way, the node 14 is modular, upgradeable, and provides a "pay-as-you-grow" architecture. The components of node 14 may be coupled by direct, indirect or other suitable connection or association. In the illustrated embodiment, the elements 62, 64, 68, and 66 and devices in the elements are connected with optical fiber connections; however, other embodiments may be implemented in part or otherwise with planar wave guide circuits and/or free space optics.

In one embodiment, the transport elements 62 and 64 each comprise amplifiers 70, a drop coupler 72, and an add coupler 74. The amplifiers 70 amplify the optical signals. The drop coupler 72 is operable to split the optical signal into a drop signal and a pass-through signal, wherein both signals are substantially the same. In addition, the transport elements 62 and 64 each comprise an add coupler 74 operable to combine both the assigned subband generated at transmitting element 68 and the pass-through signal. Coupler 74 may be replaced in certain embodiments by an add coupler, such as a thin-film, fixed, tunable, or other suitable types of filters, which is operable to terminate signals on the transmitting λ assigned to node 14 in addition to combining add traffic and pass-through traffic.

Drop couplers 72 and 74 may each comprise an optical fiber coupler or other optical splitter operable to combine and/or split an optical signal. As used herein, an optical splitter or an optical coupler is any device operable to combine or otherwise generate a combined optical signal based on two or more optical signals and/or to split or divide an optical signal into discrete optical signals or otherwise passively discrete optical signals based on the optical signal. The discrete signals may be similar or identical in frequency, form, and/or content. For example, the discrete signals may be identical in content and identical or substantially similar in power, may be identical in content and differ substantially in power, or may differ slightly or otherwise in content. In one embodiment, each drop coupler 72 may split the signal into two copies with substantially different power.

The amplifiers 70 may be Erbium-doped fiber amplifiers (EDFAs) or other suitable amplifiers capable of receiving and amplifying an optical signal. To reduce the optical power variations of the clockwise ring 21 and of the counterclockwise ring 20, the amplifiers 70 may use an automatic level control (ALC) function with wide input dynamic-range. Hence the amplifiers 70 may deploy automatic gain control (AGC) to realize gain-flatness against input power variation, as well as variable optical attenuators (VOAs) to realize ALC function.

During operation of node 14, the amplifier 70 of each transport element 62 and 64 receives a signal from the connected fiber 20 or 21 and amplifies the signal. The amplified signal is forwarded to the drop coupler 72. The drop coupler 72 splits the signal into a pass-through signal and a drop signal. The drop signal includes at least a subset of the set of wavelengths assigned to the node 14. The pass-through signal is forwarded to the add filter 74. The local drop signal is forwarded from the drop coupler 72 to receiving element 66, which selectively passes the input signals to a receiver 86. The add filter 74 combines the pass-through signal and signals generated by the transmitting element 68.

In the illustrated embodiment, the receiving element includes two 1×n couplers 76, a plurality of tunable (or fixed) filters 80, a plurality of selectors 82, a plurality of 2×1 switches 84, one or more receivers 86, and a switch element 88. The 1×n couplers 76 may comprise one optical fiber lead and a plurality of optical fiber leads which serve as drop leads 78. The drop leads 78 may be connected to the plurality of tunable filters 80 operable to pass a selected wavelength and reject other wavelengths. In the illustrated embodiment, drop lead 78A associated with fiber 20 and drop lead 78B associated with fiber 21 are coupled to tunable filters 80A and 80B, respectively.

The selected wavelengths from 80A and 80B are passed to the selector 82 and switch 84, which allows selective connection of the receiver 86 with either an associated drop signal coming from optical ring 20 or an associated drop signal coming from the ring 21. Such selective switching may be used to implement Optical Unidirectional Path-Switched Ring (OUPSR) protection switching. In a particular embodiment, the selector 82 is initially configured to forward to the local client(s) traffic from a fiber 20 or 21 that has the lower Bit Error Rate (BER). A threshold value is established such that the switch remains in its initial state as long as the BER does not exceed the threshold. Another threshold or range may be established for power levels. For example, if the BER exceeds the BER threshold or if the power falls above or below the preferred power range, the switch selects the other signal. Commands for switching may be transmitted via connection 90. This results in local control of switching and simple and fast protection. After optical-to-electrical conversion of the signal, receiver 86 transmits data segments, to switch element 88. Although the description below focus on an embodiment of data center node 12 in which receiver 86 forwards data segments to switch element 88 as frames 104, receiver 86 may forward data segments to switch element 88 in any appropriate form. Additionally, although FIG. 3 shows only a single receiver 86, local node 14 may include any number of receivers 86 with appropriate numbers of all associated equipment including filters 80, selectors 82, and switches 84. As a result, local node 14 may be capable of receiving optical signals on one or more receiving wavelengths.

Switch element 88 may comprise any appropriate switch such as, for example, an L2 switch, an L3 switch, or any other suitable switch. Upon receiving frames 104, switch element 88 determines a destination local client for frames 104 based on addressing information 46 and transmits frames 104 to a client port 18 coupled to the destination local client 16. Some or all frames 104 may contain addressing information 46 that include VLAN tags 48 identifying a VLAN associated with the destination client. VLAN tags 48 may identify the VLAN associated with the destination client in any appropriate manner. For frames 104 that include VLAN tags 48, switch element 88 may determine the destination client port 18 for the frames 104 based on VLAN tag 48 or any appropriate combination of VLAN tag 48 and other components of addressing information 46.

In a particular embodiment, VLAN tags 48 represent numeric values and switch element 88 contains, or has access to, a mapping table 60 in memory 100, which maps VLAN tags 48 to client ports 18 coupled to clients that are members of the associated VLAN. For example in FIG. 3, the illustrated local node 14 utilizes mapping table 60 which maps VLAN tags 48 of "1", "3", and "8" to client ports 18a, 18b, and 18d, respectively. As suggested by FIG. 3, a particular local node 14 may not have any local nodes 14 associated with a particular VLAN tag 48, such as a VLAN tag 48 of "2" in the illustrated mapping table 60. When local node 14 receives traffic that includes frames 104 with VLAN tags 48 for which local node 14 has no associated client ports 18, switch element 88 may discard these frames 104 in an appropriate manner. Otherwise, switch element 88 identifies a client port 18 associated with the VLAN tag 48 of frames 104 and transmits these frames 104 to the identified client port 18. As a result of this process, VLAN tags 48 may reduce the need for network layer switching functionality during the transmission of traffic between clients that are members of the same VLAN.

Switch element 88 also receives, through client ports 18, frames 104 or data segments of another suitable form from local clients 16 for transmission on network 10. Before forwarding frames 104 for transmission, switch element 88 may attach VLAN tags 48 to any frames 104 received from client ports 18 associated with VLANs based on mapping table 60. For example, in the illustrated embodiment, switch element 88 attaches a VLAN tag 48 of "3" to frames 104 received on client port 18. As described above, data center node 12 and other local nodes 14 may subsequently use these VLAN tags 48 to determine appropriate destination local clients 16 to receive the transmitted frames 104.

After attaching any appropriate VLAN tags 48, switch element 88 transmits frames 104 to transmitting element 68. In the illustrated embodiment, transmitting element 68 comprises a 2×n coupler 92 and one or more tunable transmitters 94 that transmit the frames 104 into a plurality of optical signals transmitted in one or more wavelengths assigned to the node 14. The 2×n coupler 92 comprises a plurality of leads which serve as add leads and may be connected to the one or more tunable (or fixed-wavelength) transmitters 94. The tunable transmitters 94 are operable to transmit add signals at selected wavelengths and thus provide flexible assignment of wavelengths to the node 14. The coupler 92 splits the add signal into two substantially similar signals, wherein one signal is added to the fiber 20 and the other signal is added to the fiber 21. The add signals are forwarded to the add filters 74 for addition to the associated fiber 20 or 21, as described above. The add filters 74 rejects signals transmitted at the assigned subband and combines the pass-through signal with the add signals transmitted at the assigned subband by the transmitting element 68. Although FIG. 3 shows only a single transmitter 94, local node 14 may include any number of transmitters 94 with appropriate numbers of all associated equipment including couplers 92. As a result, local node 14 may be capable of transmitting optical signals on one or more transmitting wavelengths.

In the illustrated embodiment, the same or substantially the same signals are communicated over both the fibers 20 and 21. Therefore, a single set of the receivers 86 may be used to receive signals from the fibers 20 or 21 (one or the other are received, depending on the position of switch 84 and selector 82), the same set of the transmitters 94 may be used to transmit the same signals to both the fibers 20 and 21. Such a configuration is appropriate when providing OUPSR protection. However, in other embodiments, local node 14 may include a separate set of the receivers 86 associated with each of fibers 20 and 21, and a separate set of the transmitters 94 associated with each of fibers 20 and 21. In this case, no switch 84 and selector 82 are needed. Instead, the drop signals associated with each fiber 20 or 21 are coupled to the set of the receivers 86 associated with each ring. Therefore, different signals may be received from the fibers 20 and 21.

Similarly, instead of splitting the signal from a set of the transmitters 94 using a coupler 92 and providing this signal to both the fibers 20 and 21, a different signal may be generated by the set of the transmitters 94 associated with the fiber 20 and the set of the transmitters 94 associated with the fiber 21. Therefore, different signals may be communicated over each fiber 20 and 21. For example, a first signal can be added in a particular channel on the fiber 20 at the node 14, and an entirely different signal can be added in the same channel on the fiber 21 by the same node 14.

As described above, the use of VLAN tagging may decrease the time and computational complexity for data center node 12 and local nodes 14 in resolving addresses network 10. By providing a technique for delivering traffic which reduces or eliminates the need for network layer switching for certain traffic, particular embodiments of network 10 may provide a faster and less expensive mechanism for transmitting traffic between local nodes 14.

Nonetheless, certain characteristics of add drop optical networks may limit the effectiveness of VLAN addressing techniques. Because all traffic transmitted on the receiving wavelength $\lambda_R$ is received by all local nodes 14 on network 10, a local node 14 that transmits a VLAN-tagged frame 104 to data center node 12 may receive the tagged frame 104 back on the receiving wavelength $\lambda_R$. The transmitting local node 14 may then mistakenly attempt, based on the port mapping in mapping table 60, to deliver the frame 104 to the client port 18 that originally transmitted the frame 104. This may create an undesirable situation known as "reflection," as the transmitting local client 16 may mistakenly process the frame 104 as if the frame 104 had been destined for that local client or other unwanted results may occur. One solution to this problem may be the use of mapping tables to remap the VLAN tags 48 in transmitted frames 104 to prevent the reflection of tagged frames 104 to the original transmitting client port 18. FIGS. 4A-4D and 5A-5C illustrate operation of particular embodiments of network 10 that utilize such mapping tables to reduce or eliminate the occurrence of frame reflection.

FIGS. 4A-4D illustrate operation of a particular embodiment of an optical network according to one embodiment of the present invention. In the illustrated embodiment, local nodes 14 transmit traffic which is initially tagged with a particular VLAN tag 48 (a transmitter tag 112) with the transmitter tag 112 selected based on a transmitter mapping table 110. Data center node 12 receives the tagged traffic and re-tags this traffic with a new VLAN tag 48 (a receiver tag 114) based on information included in a transition mapping table 120. Local nodes 14 then re-map receiver tags 114 on traffic received by the local nodes 14 from data center node 12 based on uniquely assigned mappings defined by receiver mapping tables 130 to determine destination client ports 18 for the tagged traffic. As a result of this re-mapping, the illustrated embodiment of network 10 may prevent VLAN-tagged traffic from being returned to the client port 18 that transmitted the tagged traffic, as described in greater detail below. For the purposes of illustration, the illustrated embodiment of network 10 is assumed to transmit information, whether optical or electrical, in the form of frames 104. Thus, the generic terms "frame" or "frames" may be used to refer to both optical and electrical information depending on the current location of the transmitted information within network 10.

Figure 4A:
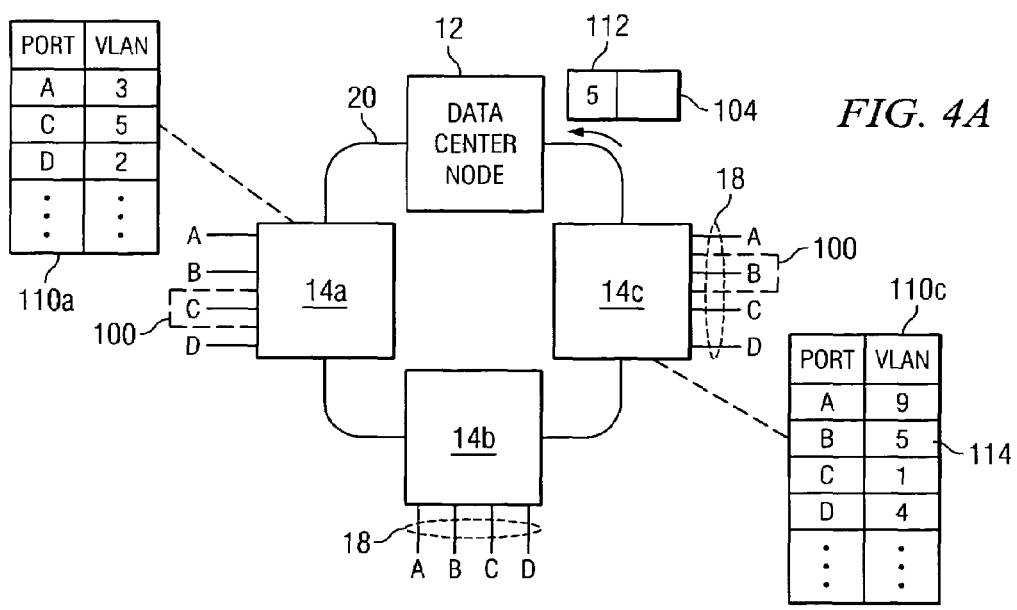
FIGS. 4A-4E illustrate operation of an optical ring network according to a particular embodiment.

FIG. 4A illustrates transmission of frame 104 by local node 14c on optical ring 20. More specifically, FIG. 4A illustrates operation of network 10 as local node 14c transmits information from client port 18b of local node 14c to client port 18c of local node 14a. In the illustrated embodiment, client port 18b of local node 14c and client 18c of local node 14a are the only local node ports 18 associated with VLAN "5," indicated by the dashed box around each of these two client ports 18. Local node 14c generates optical traffic, as described above, in the form of frame 104 and, based on transmitter mapping table 110c (which indicates that port 18b is associated with VLAN "5"), attaches transmitter tag 112 of "5" to frame 104. Local node 14c then transmits the tagged frame 104 around optical ring 20 on a transmitting wavelength assigned to local node 14c, $\lambda_3$ in this example, towards data center node 12.

Figure 4B:
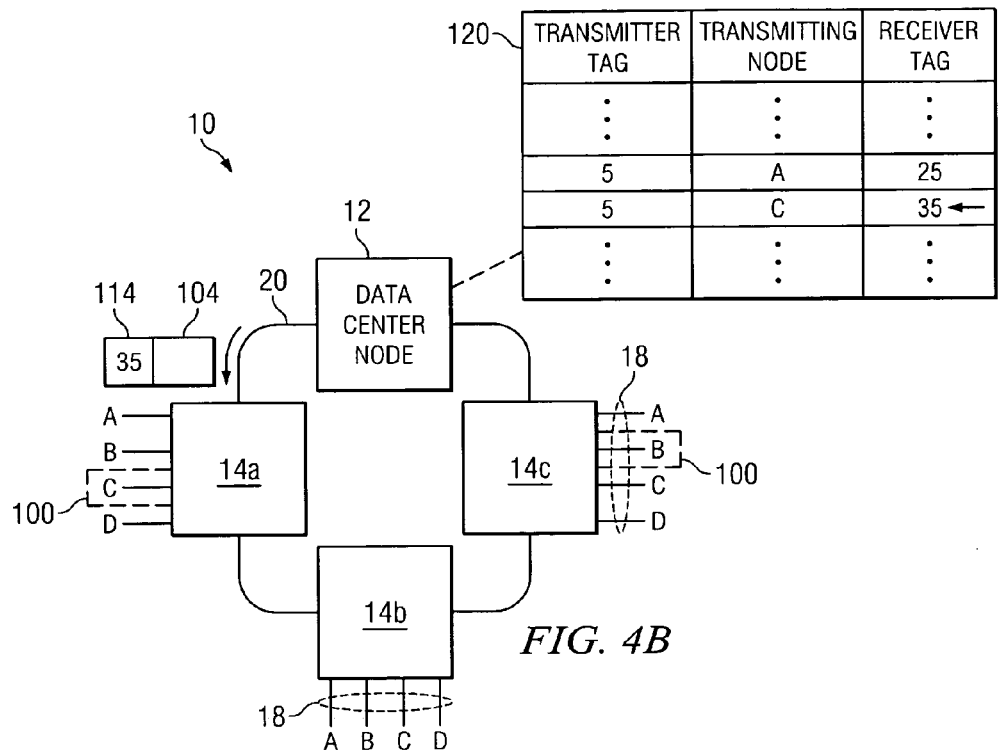

FIG. 4B illustrates operation of network 10 after data center node 12 receives the tagged frame 104. In the illustrated embodiment, data center node 12 determines which local node 14 transmitted the tagged frame 104 based on the transmitting wavelength on which data center node 12 received the tagged frame 104. Data center node 12 then selects a receiver tag 114 associated with the tagged frame 104 from transition mapping table 120, based on the local node 14 which transmitted the tagged frame 104.

Transition mapping table 120 includes information associating receiver tags 114 with transmitter tags 112 based on the local node 14 that transmitted the tagged frame 104. Although transition mapping table 120 is described in this description as a "table," transition mapping table 120 may represent a table, an array, a linked list, or information structured in any other appropriate manner. As shown, transition mapping table 120 associates a transmitter tag 112 of "5" with receiver tags 114 of "25" or "35," depending on which of the two local nodes 14a or 14c associated with VLAN "5" transmitted the frame 104. Because, in this example, data center node 12 has determined that this particular frame 104 was transmitted by local node 14c, data center node 12 selects a receiver tag 114 of "35."

Data center node 12 then attaches the selected receiver tag 114 to frame 104. Data center node 12 may attach the selected receiver tag 114 by removing transmitter tag 112 and adding the selected receiver tag 114, by overwriting transmitter tag 112 with the selected receiver tag 114, or by adding the information in transmitter tag 112 to frame 104 in any other suitable manner. After data center node 12 has attached the selected receiver tag 114 to frame 104, data center node 12 then transmits the retagged frame 104 over optical ring 20 on receiving wavelength $\lambda_R$.

Figure 4C:
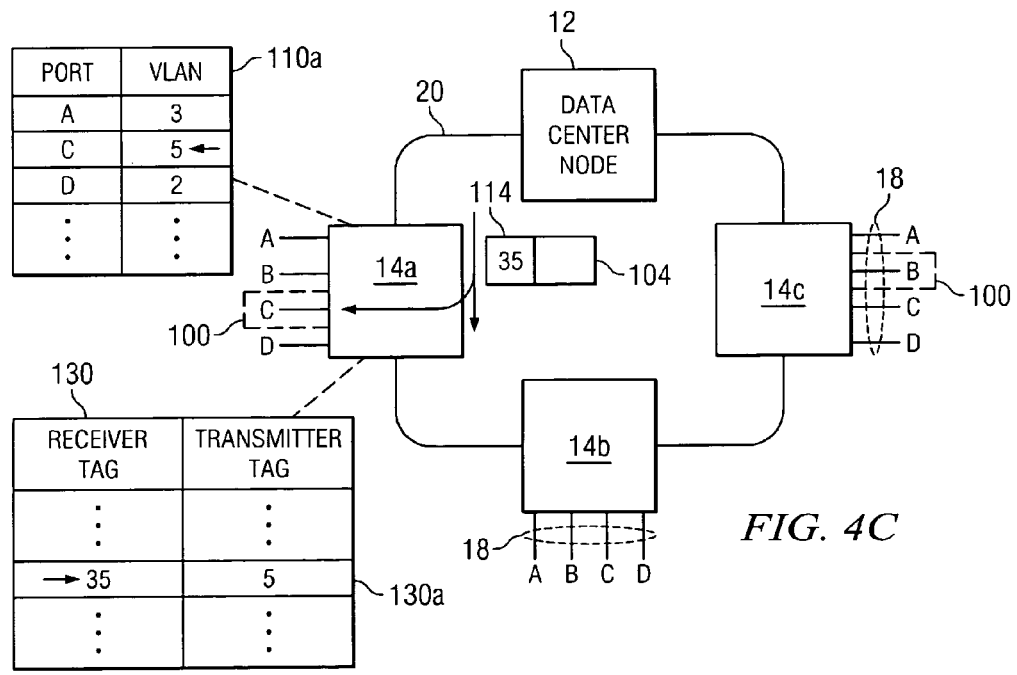

FIG. 4C illustrates operation of network 10 after transmitting the retagged frame 104. As shown in FIG. 4C, data center node 12 transmits the retagged frame 104 on receiving wavelength $\lambda_R$. Local node 14a receives and drops frame 104 to switch 88 (as well as all other traffic in the receiving $\lambda$). Switch element 88 or other components of local node 14a extract receiver tag 114 and attempts to remap receiver tag 114, using information stored in a receiver mapping table 130 of local node 14a, to determine whether receiver tag 114 is associated with any local client ports 18 supported by local node 14a.

Receiver mapping table 130 includes information associating receiver tags 114 with client ports 18 of local node 14. Although receiver mapping table 130 is described in this description as a "table," receiver mapping table 130 may represent information structured in any appropriate manner. Receiver mapping table 130 may associate receiver tags 114 with transmitter tags 112 or other identifying information of the relevant VLAN, and local node 14 may identify appropriate client ports 18 to receive frame 104 using transmitter mapping table 110 and/or other appropriate information in conjunction with receiver mapping table 130. For example, in the illustrated embodiment of local node 14, receiver mapping table 130 associates receiver tags 114 and transmitter tags 112. In such an embodiment, local node 14 may identify the original transmitter tag 112 associated with the receiver tag 114 attached to the received frame 104 using receiver mapping table 130. Local node 14 may then identify one or more client ports 18 associated with that receiver tag 114, using transmitter mapping table 110. Alternatively, receiver mapping table 130 may, in particular embodiments, associate receiver tags 114 with client ports 18 of local node 14 directly.

For example, receiver mapping table 130 may include entries that map a receiver tag 114 of "35" directly to a client port 18 of "B."

Returning to the illustrated example, local node 14a determines that receiver tag 114 of "35" is associated with a VLAN that includes client port 18c of local node 14a as a member. As a result, local node 14 then performs any appropriate switching and transmits the retagged frame 104 to client port 18c. Thus, the non-source member of the relevant VLAN receives frame 104 as intended.

Figure 4D:
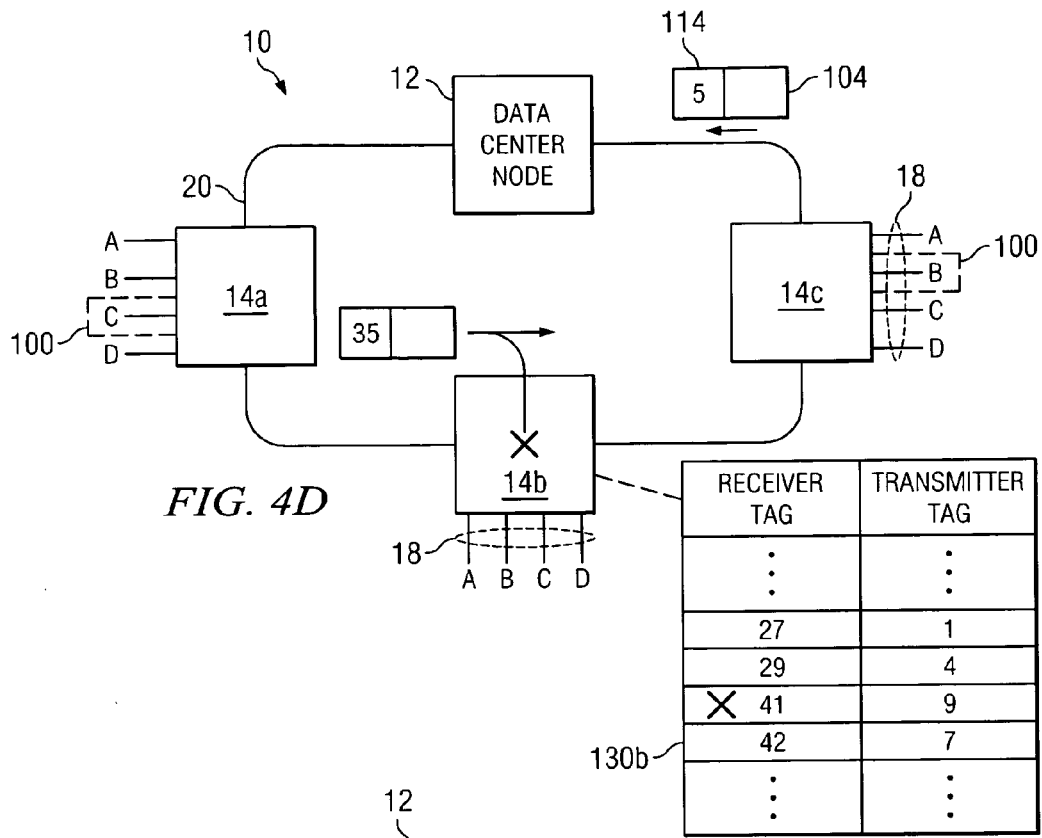

FIG. 4D illustrates operation as the retagged frame 104 continues to propagate around optical ring 20. As shown in FIG. 4D, when frame 104 reaches local node 14b, local node 14b drops frame 104 to switch 88 as described above. Switch element 88 or another component of local node 14b extracts receiver tag 114 and determines, using information stored in receiver mapping table 130b, whether receiver tag 114 is associated with any local clients 16 supported by local node 14b. Assuming there is no overlap of transmitter tags 112 and receiver tags 114 utilized on network 10, receiver mapping table 130b will not have any entries matching receiver tag 114 in this example. As a result, switch element 88 of local node 14b will discard tagged frame 104. Thus, as intended, client ports 18 that are not member of the VLAN will not receive frame 114.

Figure 4E:
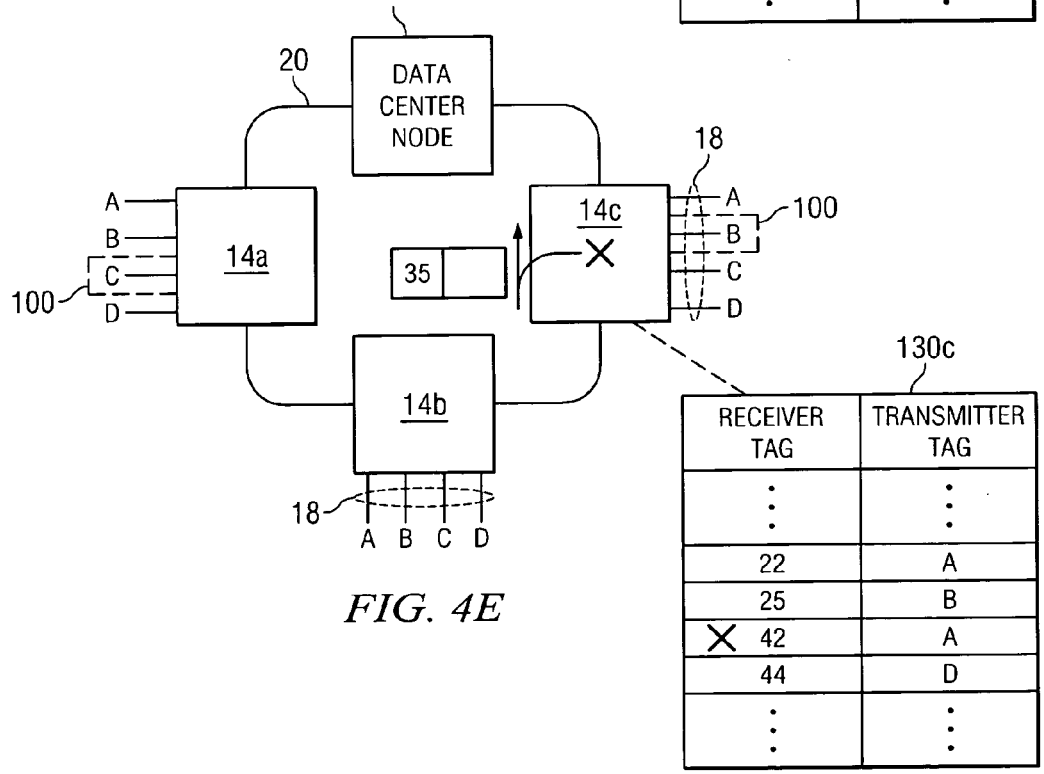

FIG. 4E illustrates operation as the retagged frame 104 continues to propagate around optical ring 20 to local node 14c. As shown, in FIG. 4E, when frame 104 reaches local node 14c, frame 104 is dropped to switch 88. Switch element 88 or another component of local node 14c extracts receiver tag 114 and determines, using information stored in receiver mapping table 130c of local node 14c, whether receiver tag 114 is associated with any local clients 16 supported by local node 14c. In this case, the transmitting local node 14 does not have an entry in receiver mapping table 130c associated with a receiver tag 114 of "35." Thus, switch element 88 of local node 14c discards frame 104 without transmitting frame 104 to any client ports 18 of local node 14c. In particular, local node 14c does not transmit frame 104 to the source client port 18 that originally transmitted frame 104, client port 18b here. Thus, the reflection problem is eliminated in this example transmission.

Because receiver mapping tables 130a and 130c are unique for the two local nodes 14 in this example, the described techniques may eliminate the occurrence of reflection in intra-VLAN communication on network 10. Additionally, because receiver mapping tables 130 can be communicated to local nodes 14, initially and/or when updated, in an out-of-band optical supervisory channel (OSC) or using other suitable control signals, particular embodiments of network 10 may provide a scalable networking solution that can easily be re-configured as needed.

Figure 5A:
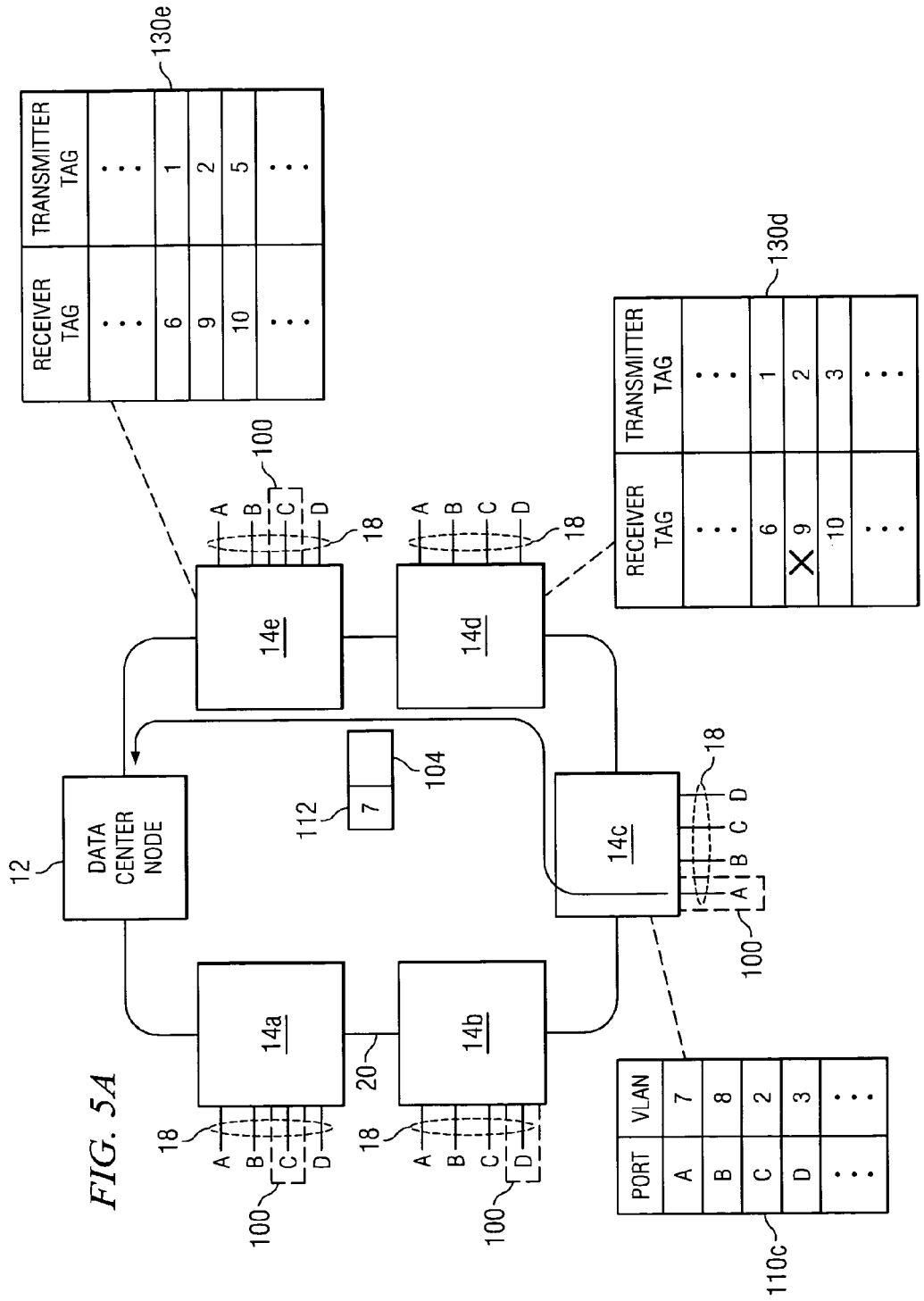
FIGS. 5A-5C further illustrate operation of an optical ring network according to another embodiment.
Figure 5B:
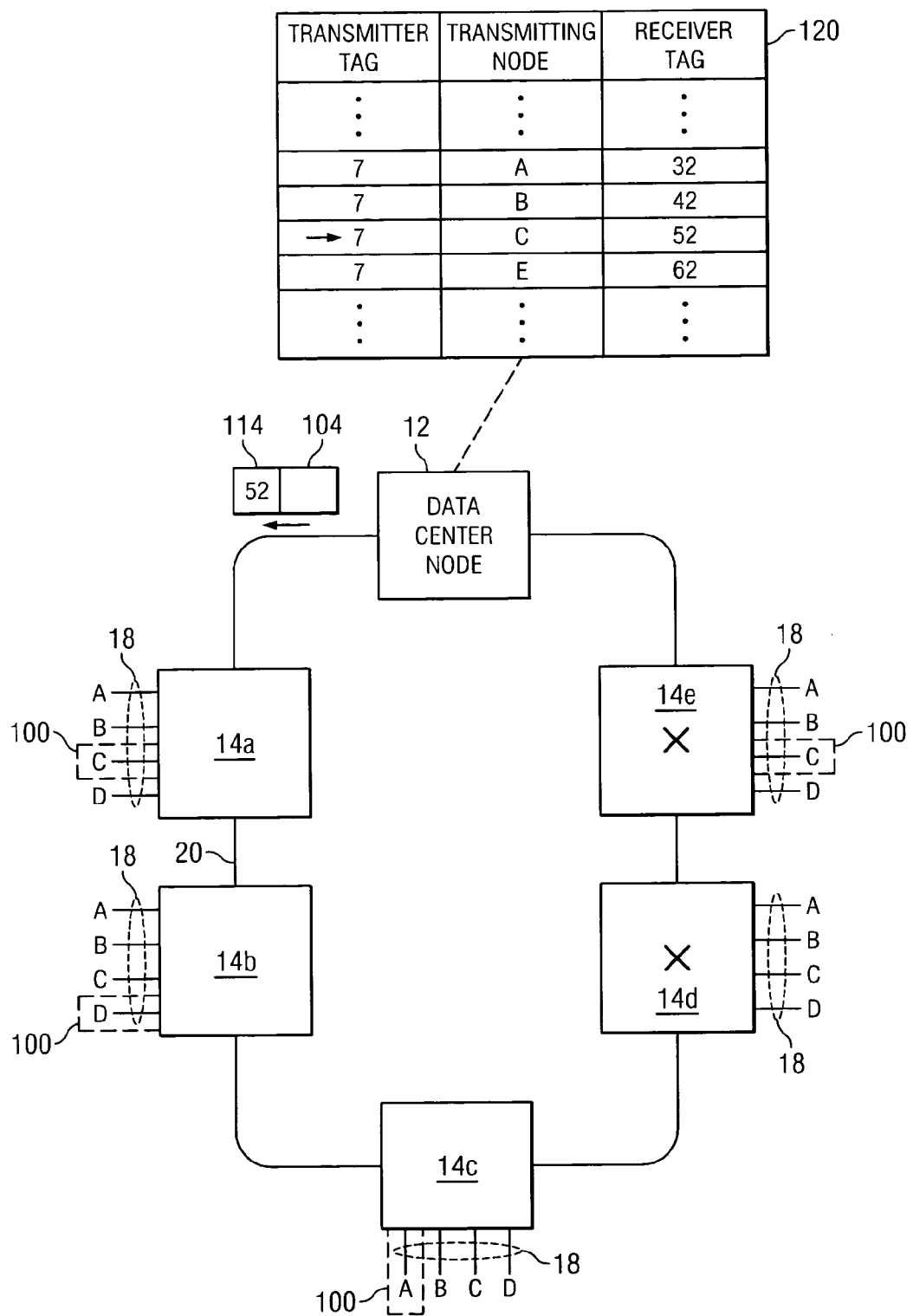
Figure 5C:
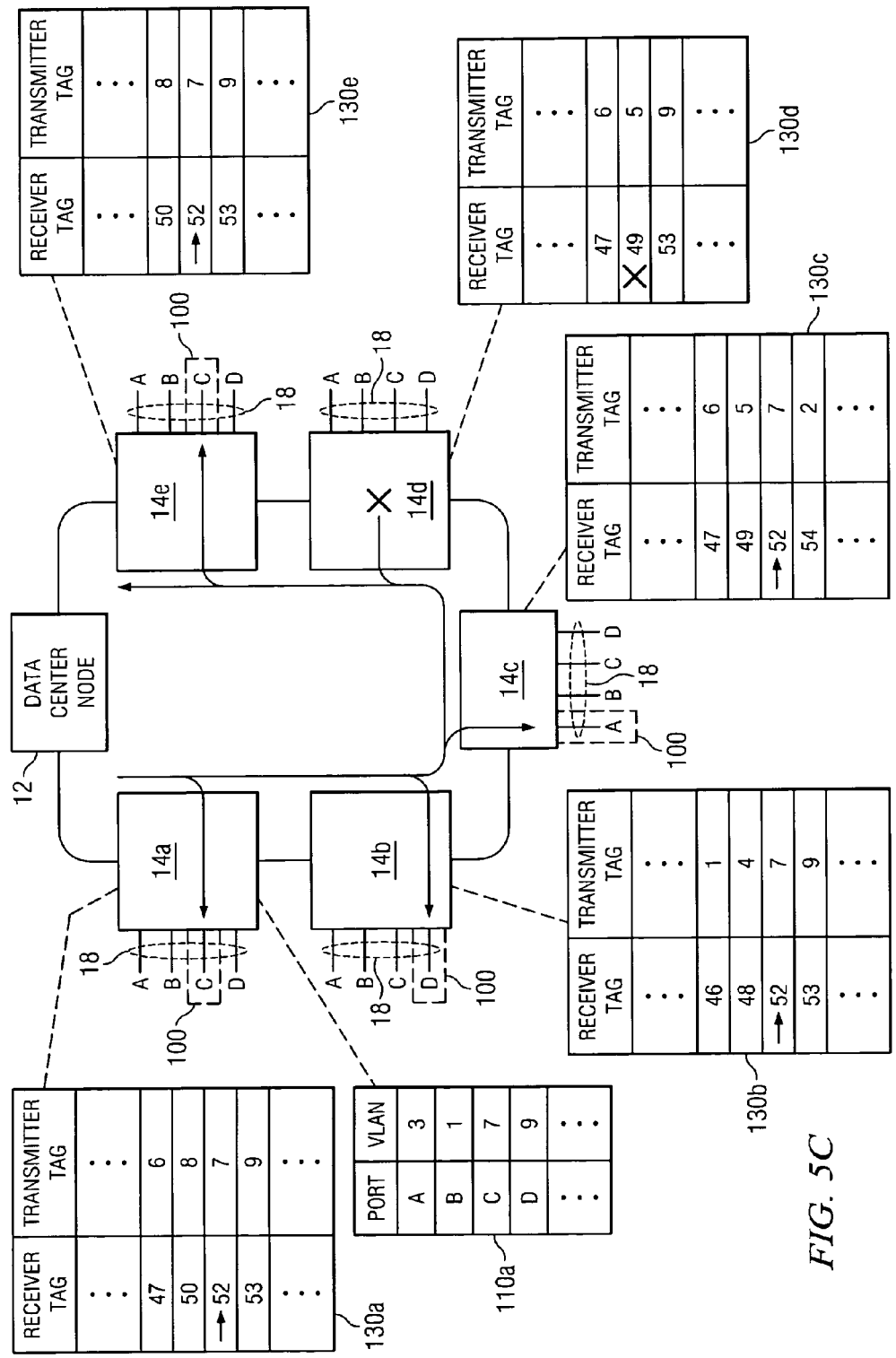

FIGS. 5A-5C illustrate operation of an optical network including local nodes 14a-e according to another embodiment of the present invention. In the illustrated embodiment, client port 18a of local node 14c, client port 18c of local node 14e, client port 18c of local node 14a, and client port 18d of local node 14b are all associated with a VLAN "7." FIGS. 5A-5C illustrate operation of network 10 as client port 18c of local node 14c transmits a tagged frame 104 to all local clients 16 on VLAN "7."

In the illustrated embodiment, data center node 12 stores or has access to a transition mapping table 120 that includes one or more entries for each VLAN on network 10. More specifically, receiver mapping table 130 includes, for each VLAN on network 10, an entry for every local node 14 on the VLAN. These entries associate a receiver tag 114 with each local node 14. As described in greater detail below, data center node 12 then uses the receiver tag 114 associated with a particular client port 18 for retagging all tagged frames 104 received from that local node 14. For example, in the illustrated embodiment, transition mapping table 120 includes separate entries specifying a particular receiver tag 114 for each local node 14 of each VLAN including, for VLAN "7", entries for local nodes 14a, 14b, 14c, and 14e.

Additionally, each local node 14 includes receiver mapping table 130 that associates receiver tags 114 with particular VLANs or with local nodes 14 on particular VLANs. In a particular embodiment, receiver mapping table 130, for a particular local node 14, will re-map a given receiver tag 114 to the original transmitter tag 112 from which data center node 12 generated the relevant receiver tag 114 or to the VLAN associated with that original transmitter tag 112 from which associated with all other local nodes 14 on the VLAN. Moreover, receiver mapping table 130 for a particular local node 14 will specifically exclude the transmitter tag associated with that local node 14 in transition mapping table 120. For example, in the illustrated embodiment, VLAN "7" has client ports 18 on local nodes 14a, 14b, 14c, and 14e. Receiver mapping table 130 on local node 14c will specify receiver tags 114 for frame 104 transmitted on VLAN "7" by local nodes 14a, 14b, and 14e, but not by local node 14c itself. Thus, switch element 88 of local node 14c will not recognize retagged frames 104 originally transmitted by local node 14c as being associated with VLAN "7" and/or any client ports 18 of local node 14c, but will recognize frames 104 for VLAN "7" sent by local nodes 14a, 14b, 14e based on receiver tags 114 attached to those frames 104. As illustrated, receiver mapping table 130c includes entries for VLAN "7" receiver tags 114 associated with frames 104 from local nodes 14a, 14b, and 14e. Although, for the purposes of illustration, FIG. 5A shows receiver mapping table 130 as including information identifying the local node 14 associated with a particular receiver tag 114 for that VLAN, this information may not be needed by local nodes 14 for processing and particular embodiments may not include this information.

FIG. 5A illustrates the transmission of frame 104 by local node 14c on optical ring 20. More specifically, FIG. 5A illustrates operation of network 10 as local node 14c transmits frame 104 from client port 18b of local node 14c to all other client ports 18 on VLAN "7." In the illustrated embodiment, client port 18a of local node 14c, client port 18c of local node 14e, client port 18c of local node 14a, and client port 18d of local node 14b are all members of VLAN "7." Local node 14c generates frame 104 as described above and, based on mapping table 60, attaches a transmitter tag 112 of "7" to frame 104. Local node 14c then transmits the tagged frame 104 to data center node 12 on transmitting wavelength $\lambda_3$. Because local node 14c transmits frame 104 on transmitting wavelength $\lambda_3$ and not on receiving wavelength $\lambda_R$ neither of the intervening local nodes 14 drop frame 104.

When frame 104 reaches local node 14d on optical ring 20, local node 14d drops frame 104. Assuming there is no overlap of transmitter tags 112 and receiver tags 114 used by network 10, local node 14d will not recognize transmitter tag 112 attached to frame 104 and will dispose of frame 104 without transmitting tagged frame 104 to any client ports 18 of local node 14d. Similarly, when tagged frame 104 reaches local node 14e, switch element 88 of local node 14e will dispose of tagged frame 104 because transmitter tag 112 will not match any receiver tags 114 in receiver mapping table 130, despite the fact that client port 18a is a member of VLAN "7."

FIG. 5B illustrates operation of network 10 after data center node 12 receives the tagged frame 104. In the illustrated embodiment, data center node 12 is able to determine which local node 14 transmitted frame 104 based on the transmitting wavelength on which data center node 12 received frame 104, in this case $\lambda_3$. Data center node 12 then selects, based on the local node 14 which transmitted frame 104, a receiver tag 114 for the tagged frames 104 from receiver mapping table 130. As shown, receiver mapping table 130 associates a transmitter tag 112 of "7" with receiver tags 114 of "32," "42," "52," or "62" depending on which of the four local nodes 14 a, 14 b, 14 c, and 14e on VLAN "7" transmitted frame 104. Because, in this example, data center node 12 has determined that this particular tagged frame 104 was transmitted by local node 14c, data center node 12 selects a receiver tag 114 of "52." Data center node 12 then attaches the selected receiver tag 114 to frame 104. After data center node 12 has attached the selected receiver tag 114 to frame 104, data center node 12 then transmits the retagged frame 104 over optical ring 20 on receiving wavelength $\lambda_R$.

FIG. 5C illustrates operation of network 10 the retagged frame 104 propagates around ring 20. As shown in FIG. 5C, data center node 12 transmits the retagged frames 104 on receiving wavelength $\lambda_R$. Local node 14a receives and drops frame 104. Local node 14a then determines, based on receiver mapping table 130a, that receiver tag 114 of "52" is associated with a VLAN that includes client port 18 as a member. As a result, local node 14 then performs any appropriate switching and transmits frame 104 to client port 18. Thus, this member of VLAN "7" receives frame 104 as intended.

Similarly, local node 14b receives and drops frame 104. Local node 14 also determines, based on receiver mapping table 130b that receiver tag 114 of "52" is associated with transmitter tag 114 of "7." Local node 14b then determines, based on a transmitter table (not shown) of local node 14b, that transmitter tag 114 "7" is associated with a VLAN that includes client port 18d as a member. As a result, local node 14 then performs any appropriate switching and transmits frame 104 to client port 18d of local node 14b. Thus, this member of VLAN "7" also receives frame 104 as intended.

When frame 104 reaches local node 14c, local node 14c drops frame 104 as well. Because receiver mapping table 130c lacks an entry for the receiver tag 114 associated with traffic transmitted by local node 14c, local node 14c determines that receiver tag 114 of "52" is not associated with any VLAN for which local node 14 receives traffic. Therefore, local node 14c disposes of frame 104. Thus, the original source local node 14c for frame 104 does not receive the retagged frame 104. As a result, the reflection problem is reduced or eliminated.

Furthermore, when frame 104 reaches local node 14d, local node 14d also drops frame 104. Assuming there is no overlap of transmitter tags 112 and receiver tags 114 used by network 10, switch element 88 of local node 14d will not recognize transmitter tag 112 attached to frame 104 and will dispose of frame 104 without transmitting frame 104 to any client ports 18 of local node 14d. Because this local node 14 does not have any client ports 18 on VLAN "7," receiver mapping table 130d of local node 14d does not contain an entry for receiver tag 114. Thus, receiver tag 114 will not match any entries in receiver mapping table 130d and local node 14d will dispose of frame 104

When frame 104 reaches local node 14e, local node 14e also drops frame 104. Unlike with transmitter tag 112 of tagged frame 104 in FIG. 5A, however, receiver mapping table 130e does contain an entry that identifies a transmitter tag 112, "7", associated with the receiver tag 114 of "52". Local node 14b then determines, based on a transmitter table (not shown) of local node 14e, that transmitter tag 114 "7" is associated with a VLAN that includes client port 18*c* as a member. As a result, local node 14*e* then performs any appropriate switching and transmits frame 104 to client port 18 "D." Thus, this member of VLAN "7" also receives the retagged frame 104 as intended.

Consequently, because each local node 14 stores a unique receiver mapping table 130 that specifies receiver tags 114 associated with VLAN traffic generated by all other local nodes 14 but that does not specify receiver tags 114 associated with traffic generated by that particular local node 14, particular embodiments of network 10 may reduce or eliminate the occurrence of reflection in network 10. This may increase the efficiency of VLAN addressing in particular embodiments of network 10 that utilize the described techniques. Additionally, because the described techniques utilize receiver mapping tables 130 that can be updated through communication between local nodes 14 and data center node 12, particular embodiments of network 10 can provide a flexible and scalable solution to the reflection problem.

Figure 6:
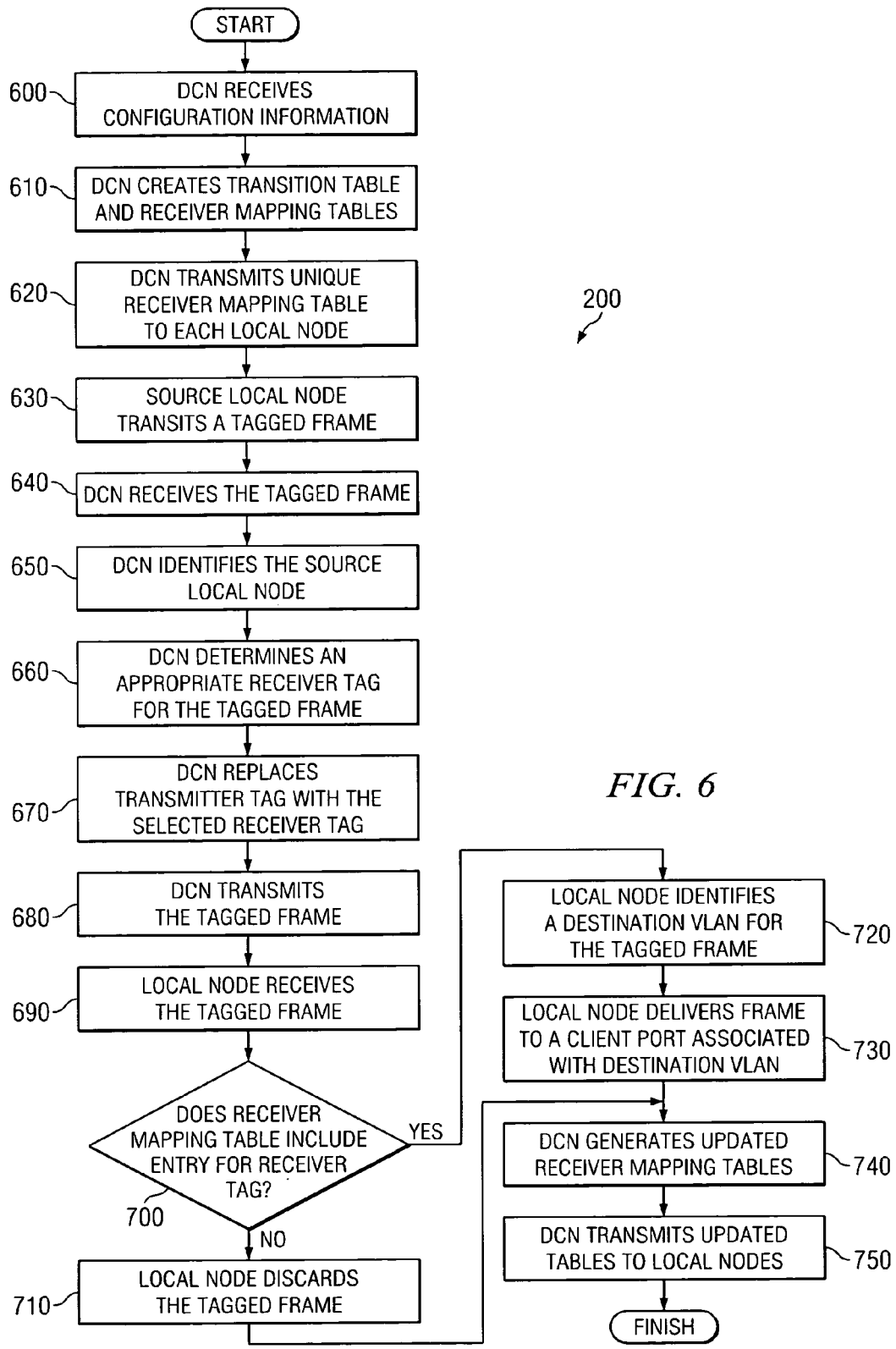
FIG. 6 is a flowchart illustrating an example method for transmitting information in an optical communication system in accordance with one embodiment of the present invention.

FIG. 6 is a flowchart illustrating a method 200 of operation for data center node 12 according to a particular embodiment of network 10. FIG. 6 illustrates operation of a particular embodiment of data center node 12 in a network 10 similar to that illustrated in FIG. 1 which includes a data center node 12, an optical ring 20, and a plurality of local nodes 14.

At step 600, data center node (DCN) 12 receives configuration information for network 10, input by a user or transmitted by any appropriate component of network 10. This configuration information may identify node configurations, VLAN members, and any other information needed to create transmitter mapping table 110, transition mapping table, or 120 receiver mapping table 130, or to perform any other tasks associated with operation of data center node 12. For example, in a particular embodiment, data center node 12 receives a transmitter mapping table 110 from each local node 14 when that local node 14 comes on-line. Although this is shown in FIG. 6 as a single step, data center node 12 may receive such configuration information over a period of time including while network 10 is in operation. Data center node 12 uses this configuration information to create transition table 120 and receiver mapping tables 130 to transmit to local nodes 14 at step 610.

At step 620, data center node 12 transmits a unique receiver mapping table 130 to each of the plurality of local nodes 14. Although data center node 12 in this embodiment, transmits receiver mapping tables 130 to local nodes 14 prior to the start of operation, data center node 12, in a particular embodiment, may transmit receiver mapping table 130 at any suitable time before and/or during operation. Alternatively, local nodes 14 may obtain receiver mapping tables 130 through independent configuration of local nodes 14 by an administrator or managing device. After transmitting receiver mapping tables 130 to local nodes 14, data center node 12 may begin receiving traffic from local nodes 14.

At step 630, a source local node 14 transmits a tagged frame 104 to a destination VLAN. Tagged frame 104 includes or is associated with a transmitter tag 112 that identifies the destination VLAN for tagged frame 104. At step 640, data center node 12 receives tagged frame 104 from the source local node 14. Data center node 12 identifies the source local node 14 for the received frame 104 at step 650. Data center node 12 may determine the source in any appropriate manner according to the configuration and characteristics of network 10. In a particular embodiment, each local node 14 is assigned a particular wavelength for transmitting frame 104, and data center node 12 identifies the source local node 14 based on the wavelength on which frame 104 was received.

Data center node 12 then determines, based on the transmitter tag 112 attached to frame 104 and the source local node 14 of frame 104, an appropriate receiver tag 114 at step 660. At step 670, data center node 12 replaces transmitter tag 112 with the selected receiver tag 114. Data center node 12 then, at step 680, transmits frame 104 on optical ring 20 at a particular receiving frequency.

At step 690, a particular local node 14 receives tagged frame 104. The recipient local node 14 determines whether receiver mapping table 130 of the recipient local node 14 includes an entry associated with receiver tag 114 at step 700. If the recipient local node 14 determines that receiver mapping table 130 of the recipient local node 14 does not include an entry associated with receiver tag 114, the recipient local node 14 discards frame 104 at step 710 and proceeds to step 740.

If the recipient local node 14 determines that receiver mapping table 130 of the recipient local node 14 does include an entry associated with receiver tag 114, the recipient local node 14 identifies, using transmitter mapping table 110 of the recipient local node 14, a destination VLAN for tagged frame 104 at step 720. At step 730, the recipient local node 14 delivers frame 104 to a client port 118 associated with the destination VLAN.

Additionally, at step 740, data center node 12 generates an updated receiver mapping table 130. Data center node 12 transmits the updated receiver mapping table 130 to one or more local nodes 14 at step 750. Data center node 12 may update receiver mapping tables 130 at any appropriate time during operation, such as when a new local node 14 is added to network 10, in response to a current local node 14 malfunctioning, or whenever VLAN definitions change. As noted above, in particular embodiments of network 10, local nodes 14 may obtain receiver mapping tables 130 locally and, thus, data center node 12 may not provide updated receiver mapping tables 130 for local nodes 14.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An optical network, comprising:
an optical ring;
a plurality of local nodes coupled to the optical ring and configured to add and drop traffic to and from the optical ring in one or more wavelengths, each local node operable to:
receive traffic from a local client;
associate a transmitter tag with the traffic, the transmitter tag identifying a virtual network with which the local client is associated;
transmit the traffic on the optical ring; and
a data center node coupled to the optical ring and operable to:
receive traffic transmitted by one of the local nodes;
determine a receiver tag for the traffic, based on the transmitter tag associated with the traffic and the local node that transmitted the traffic;
associate the selected receiver tag with the traffic; and
transmit the traffic on the optical ring.

2. The optical network of claim 1, wherein each local node includes a transmitter mapping table that specifies a transmitter tag associated with each of a plurality of virtual networks;

and wherein each local node is further operable to associate a transmitter tag with traffic from a local client by:
  identifying, based on the transmitter mapping table, a transmitter tag associated with the virtual network with which the local client is associated; and
  associating the identified transmitter tag with the traffic.

3. The optical network of claim 1, wherein the data center node is further operable to transmit a unique receiver mapping table to each of the local nodes.

4. The optical network of claim 1, wherein each local node includes a receiver mapping table that specifies a virtual network associated with each of a plurality of receiver tags; and wherein each local node is further operable to:
  receive traffic from the data center node; and
  identify, based on the mapping table and the transmitter tag associated with the traffic, a virtual network to which the traffic was transmitted.

5. The optical network of claim 4, wherein the local node includes a transmitter mapping table that specifies a particular virtual network associated with each of a plurality of transmitter tags; and wherein the local node is operable to identify the virtual network by:
  identifying, based on the receiver mapping table, a transmitter tag associated with the receiver tag associated with the traffic; and
  identifying, based on the transmitter mapping table and the identified transmitter tag, a virtual network to which the traffic was transmitted.

6. The optical network of claim 4, wherein each local node further comprises a plurality of ports through which that local node communicates with a plurality of clients, and wherein the local node is further operable to transmit the traffic to a port of the local node that is associated with the identified virtual network.

7. The optical network of claim 1, wherein the local node further comprises a plurality of ports through which the local node is operable to receive traffic from a plurality of local clients, and wherein the local node is further operable to associate a transmitter tag with the traffic that identifies a virtual network associated with the port on which the local node received the traffic.

8. The optical network of Clam 1, wherein the data center node is operable to transmit the traffic on the optical ring at a receiving wavelength, and wherein each of the local nodes is operable to transmit the traffic on the optical network at one of a plurality of transmitting wavelengths that are different from the receiving wavelength.

9. The optical network of claim 8, wherein the plurality of local nodes are further operable to both pass through and drop traffic at the receiving wavelength without performing an optical-to-electrical conversion of the traffic.

10. The optical network of claim 8, wherein the plurality of local nodes are further operable to pass through traffic at the transmitting wavelengths without performing an optical-to-electrical conversion of the traffic.

11. A method for communication on an optical network, comprising:
  receiving traffic transmitted by one of a plurality of local nodes on an optical ring;
  determining a receiver tag for the traffic based on a transmitter tag associated with the traffic and the local node that transmitted the traffic, wherein the transmitter tag identifies a virtual network to which the traffic was transmitted;
  associating the selected receiver tag with the traffic; and
  transmitting the traffic on the optical ring.

12. The method of claim 11, further comprising transmitting a unique receiver mapping table to each of the local nodes prior to transmitting the traffic on the optical ring, wherein the receiver mapping table identifies a particular virtual network associated with each of a plurality of receiver tags.

13. The method of claim 11, wherein receiving the traffic comprises receiving the traffic from among traffic transmitted at a plurality of transmitting wavelengths, the traffic having been transmitted at a particular transmitting wavelength assigned to the local node that transmitted the traffic; and wherein transmitting the traffic comprises transmitting the traffic at a receiving wavelength.

14. A optical communication device, comprising:
  a plurality of receivers operable to receive traffic transmitted by one of a plurality of local nodes on an optical network;
  a processor operable to:
    determine a receiver tag for the traffic based on a transmitter tag associated with the traffic and the local node that transmitted the traffic; and
    associate the selected receiver tag with the traffic; and
  one or more transmitters operable to transmit the traffic on the optical network.

15. The optical communication device of claim 14, wherein the processor is further operable to determine a local node that transmitted the traffic from among the plurality of local nodes based on a transmitting wavelength at which the traffic was transmitted.

16. The optical communication device of claim 14, further comprising a transition table stored in a memory, wherein the transition table includes a plurality of receiver tags, each receiver tag associated in the transition table with a transmitter tag and a local node; and wherein the optical communication device is further operable to determine the receiver tag for the traffic based on the transition table.

17. The optical communication device of claim 16, wherein each receiver tag of the transition table is associated with a transmitter tag and a transmitting wavelength of a particular node.

18. The optical communication device of claim 14, wherein the processor is further operable to generate a unique receiver mapping table for each of the local nodes, the receiver mapping table identifying a receiver tag associated with one or more virtual networks associated with the local node; and wherein the transmitters are further operable to transmit one of the unique receiver mapping tables to each local node.

19. The optical communication device of Clam 14, wherein the transmitters are operable to transmit the traffic at one or more receiving wavelengths, and wherein the receivers are operable to receive the traffic at a plurality of transmitting wavelengths that are different from the receiving wavelengths.

20. The optical communication device of claim 19, wherein the transmitters are operable to transmit the traffic at a bandwidth of 10 Gigabits per second (Gb/s) or more, and wherein the receivers are operable to receive the traffic at a plurality of bandwidths that are each less than 1 Gb/s.

* * * * *

UNITED STATES PATENT AND TRADEMARK OFFICE
CERTIFICATE OF CORRECTION

PATENT NO. : 7,477,844 B2
APPLICATION NO. : 11/015228
DATED : January 13, 2009
INVENTOR(S) : Ashwin Anil Gumaste et al.

It is certified that error appears in the above-identified patent and that said Letters Patent is hereby corrected as shown below:

Col. 2, Ln. 17: After "Figures 4A-" delete "4E" and insert -- 4D --;

Col. 2, Ln. 58: After "multiplexed" delete "(WDM)" and insert -- (DWDM) --;

Col. 7, Ln. 45: After "at wavelength" delete "2" and insert -- $\lambda_2$ --.

Signed and Sealed this

Twentieth Day of October, 2009

David J. Kappos
*Director of the United States Patent and Trademark Office*